Aug. 29, 1950 R. HOWELL 2,520,210
MOWER SICKLE GRINDER
Filed July 27, 1946 5 Sheets-Sheet 1

INVENTOR,
Roy Howell,
By Herbert A. Minturn,
ATTORNEY.

Aug. 29, 1950 — R. HOWELL — 2,520,210
MOWER SICKLE GRINDER
Filed July 27, 1946 — 5 Sheets-Sheet 2
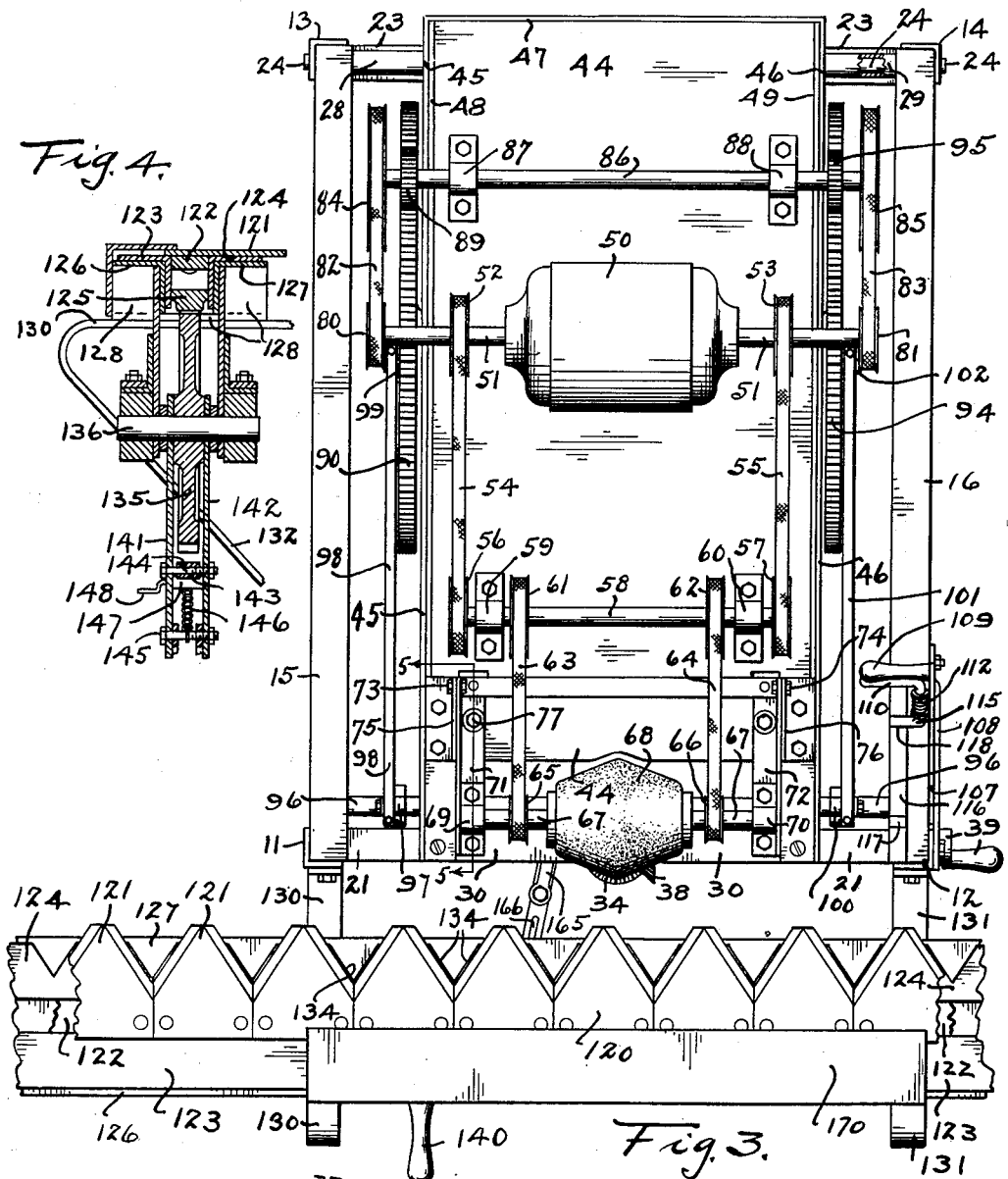
Fig. 4.
Fig. 3.
Fig. 5.
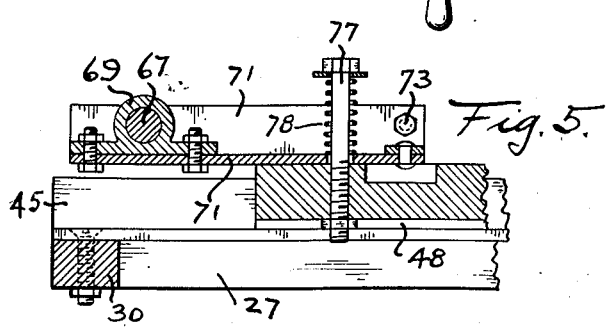
INVENTOR,
Roy Howell,
By Herbert A. Weinturn,
ATTORNEY.

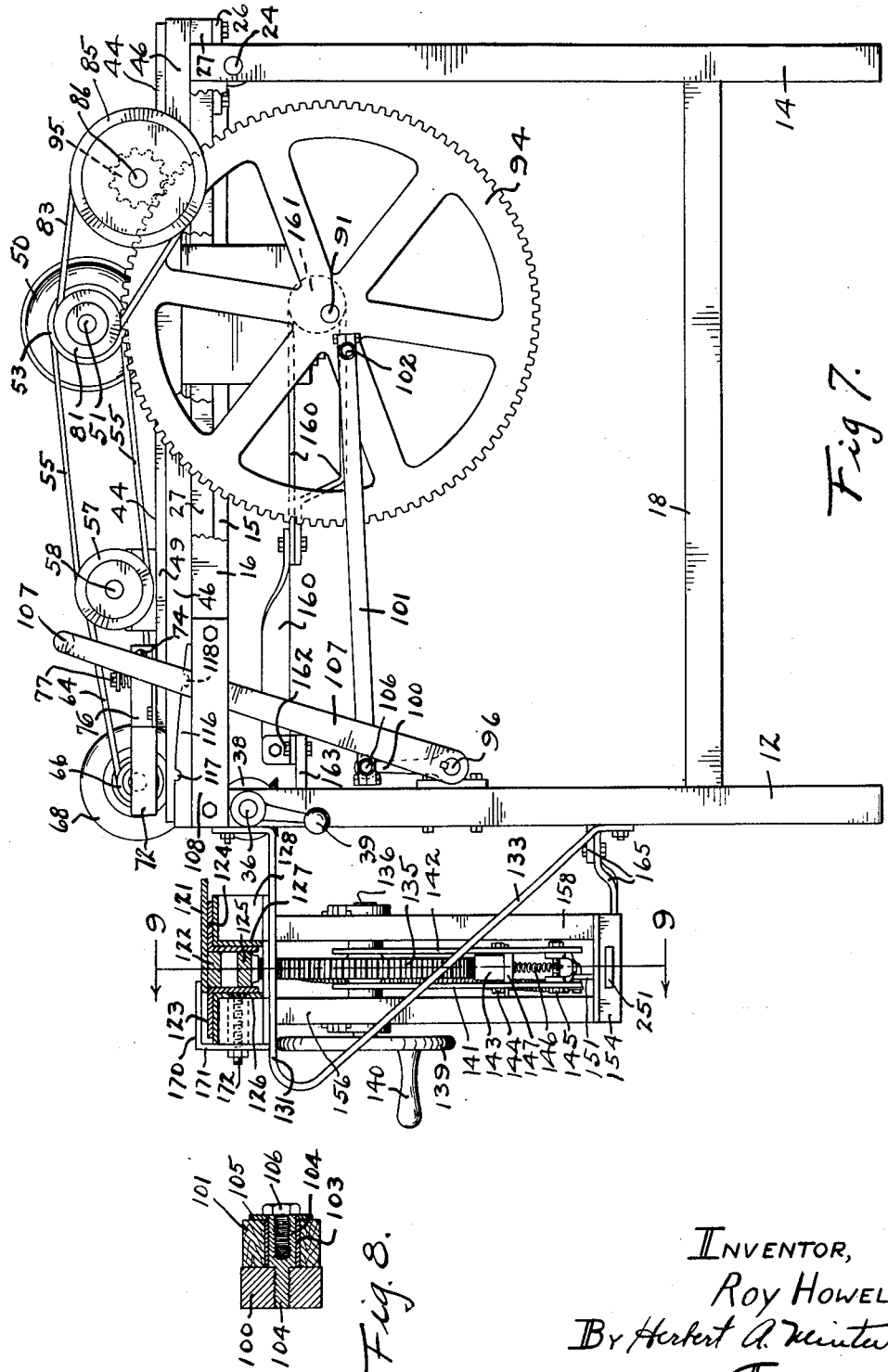

Aug. 29, 1950     R. HOWELL     2,520,210
MOWER SICKLE GRINDER

Filed July 27, 1946     5 Sheets-Sheet 5

INVENTOR,
Roy Howell,
By Herbert A. Minturn,
ATTORNEY.

Patented Aug. 29, 1950

2,520,210

UNITED STATES PATENT OFFICE 2,520,210

MOWER SICKLE GRINDER

Roy Howell, Indianapolis, Ind.

Application July 27, 1946, Serial No. 686,622

7 Claims. (Cl. 51—36)

Figure 1:
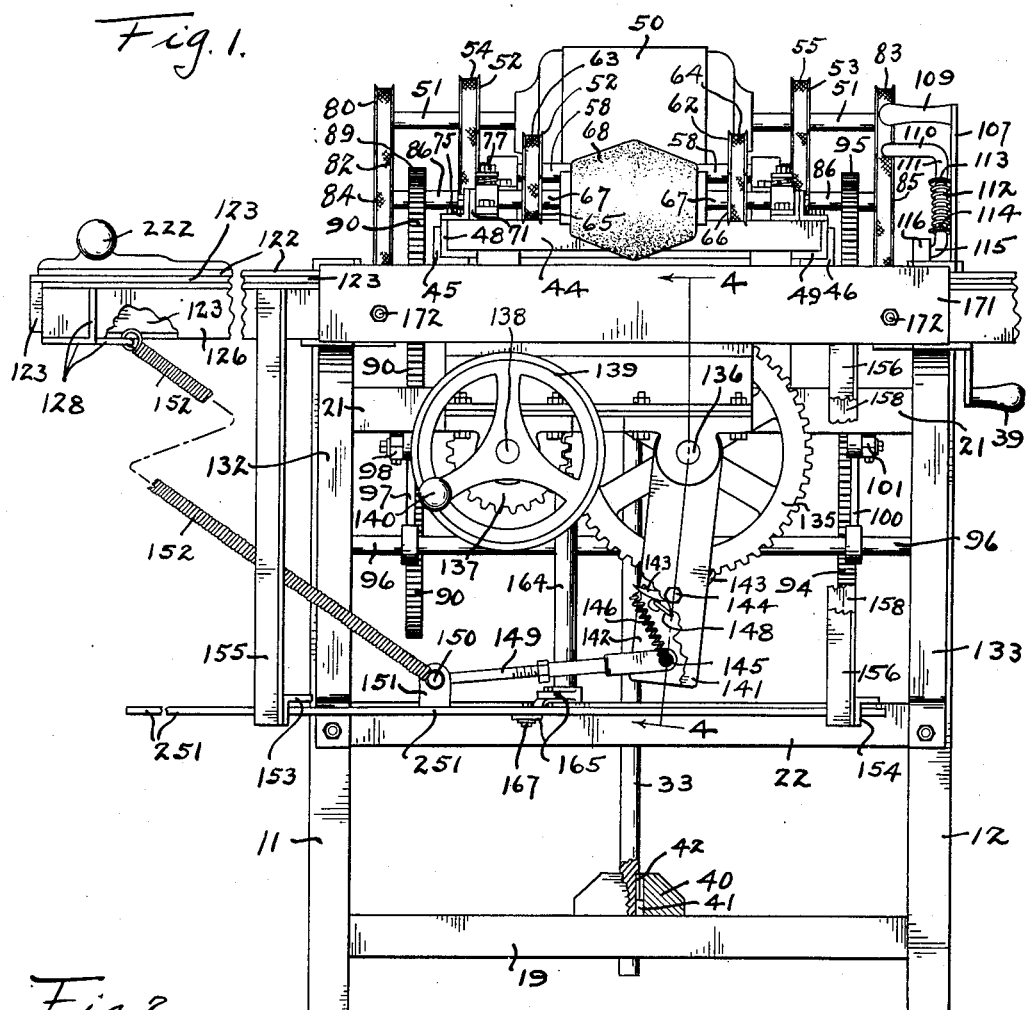
Figure 2:
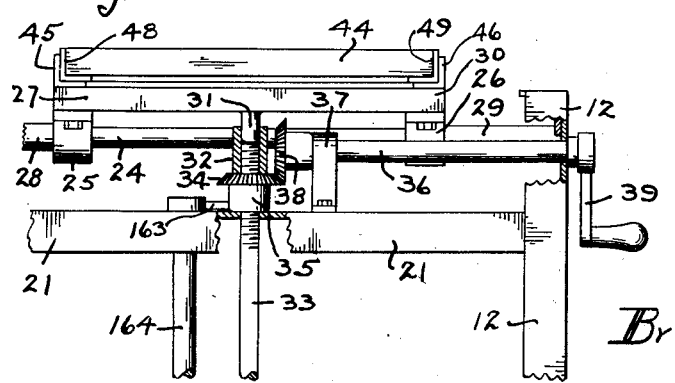
Figure 6:
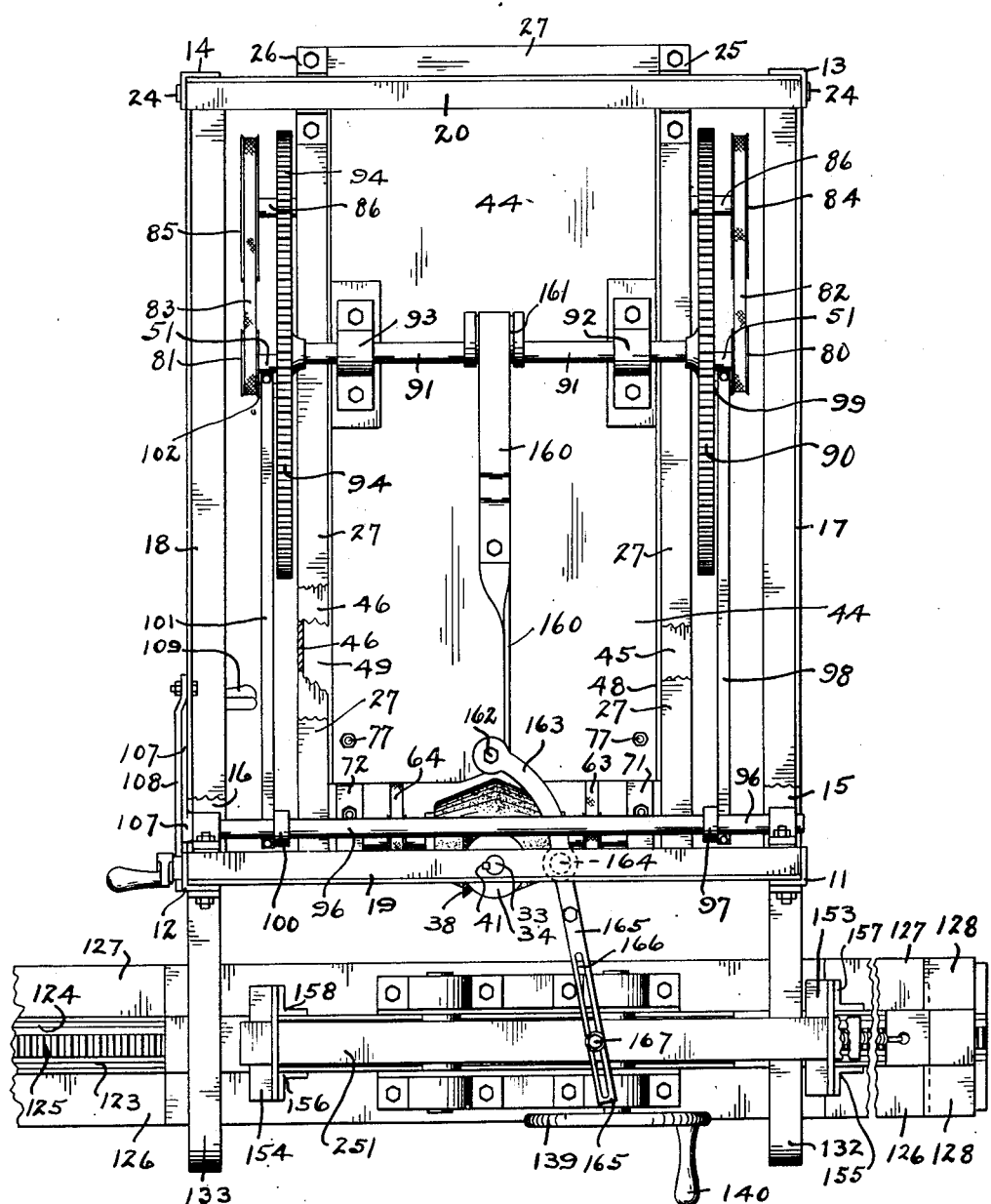
Figure 9:
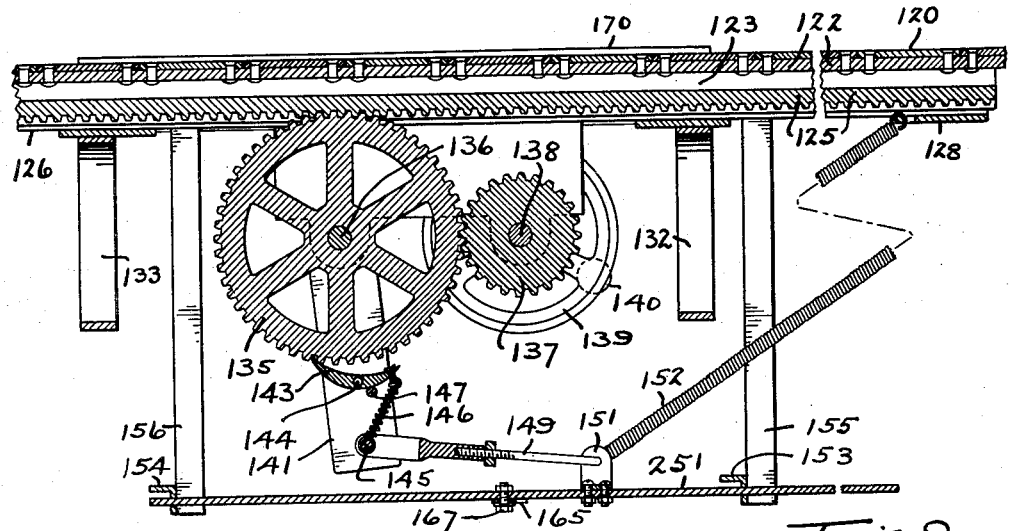

This invention relates to a machine for automatically grinding a mower sickle, grinding opposing edges of the sickle sections, one section after another automatically fed and positioned in the proper sequence in relation to the position of the grinding wheel. A primary purpose of the invention is to speed up the grinding of the complete sickle as opposed to practices heretofore employed. A further primary object of the invention is to insure that each cutting edge of each section is ground to the proper bevel back of its cutting edge. These and many other objects and advantages of the invention will become apparent to those versed in the art in the following description of one particular form of the invention as illustrated in the accompanying drawings, in which:

Fig. 1 is a view in front elevation with fragments of various parts broken away to disclose elements therebehind;

Fig. 2, a detail in front elevation and partial section of the grinding wheel elevation control mechanism;

Fig. 3, a top plan view;

Fig. 4, a view in section on the line 4—4 in Fig. 1;

Fig. 5, a view in vertical section on the line 5—5 in Fig. 3;

Fig. 6, a view in bottom plan;

Fig. 7, a view in right hand elevation and partial section in respect to the machine as viewed from the front side;

Fig. 8, a detail in vertical section through the pitman rod and positioning lever connection;

Fig. 9, a vertical section on the line 9—9 in Fig. 7; and

Figure 10:
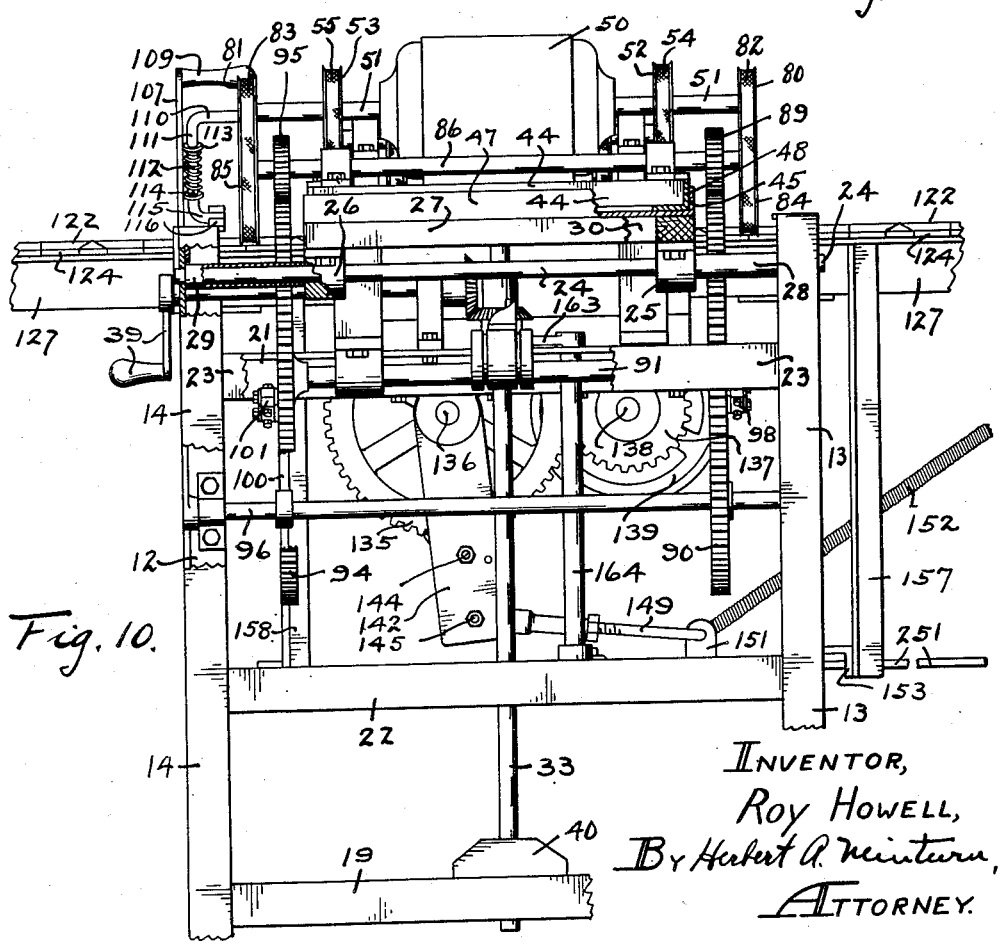

Fig. 10, a view in rear elevation and partial section of the machine.

Like characters of reference indicate like parts throughout the several views in the drawings.

Any suitable foundation framework may be provided to support the various elements of the structure embodying the invention. In the present form, this foundation structure is comprised of vertically disposed corner posts 11, 12, 13, and 14, each having the form of an angle iron. The upper end portions of these four posts are tied together, 11 to 13, and 12 to 14, by means of the fore and aft top angle iron rails 15 and 16 respectively. Like rails 17 and 18 interconnect respectively the corner posts 11 and 13, and 12 and 14, toward the lower end portions thereof. Then, there is a lower transverse angle iron 19 interconnecting the posts 11 and 12, and there is a lower transverse angle iron 20 interconnecting the posts 13 and 14. Both of these rails 19 and 20 are spaced downwardly toward the lower ends of those respective posts.

Toward the upper end portions of the posts 11 and 12, Fig. 1, is a rail 21 interconnecting therewith, and then intermediate rail 19 and that upper rail 21 is a rail 22, likewise interconnecting the posts 11 and 12. Toward the upper end portions of the rear posts 13 and 14 is an interconnecting rail 23, Fig. 10. Thus by these various rail members interconnecting with the four corner posts, a substantial, rigid frame is provided.

A shaft 24 is carried by its end portions by the rear posts 13 and 14. Mounted to revolve on the shaft 24 are two brackets 25 and 26 held in spaced apart relation by being secured against the under rear end portion of a table guide frame 27. The frame 27 is centrally spaced between the upper end portion of the posts 13 and 14 by means of collars 28 and 29 through which the end portions of the shaft 24 extend to have the respective ends of those collars abut the outer faces of the brackets 25 and 26 and the inner faces of the posts, Fig. 10. This frame 27 extends forwardly to terminate by a front cross bar 30 normally spaced above the frame rail 21. From the outside of the rail 30, herein shown as centrally disposed, there extends downwardly a short post 31 to enter a sleeve 32 which is loosely carried around the upper threaded end portions of a vertically disposed shaft 33, Fig. 2.

A bevel gear 34 is provided to have a hub 35 screw-threadedly engaged on the upper end of the shaft 33, the lower end of the sleeve 32 resting against the smooth central face of the top side of the gear 34. A horizontally disposed shaft 36 extends inwardly through the corner post 12, and a supporting bracket 37, to carry on its rear end a bevel gear 38 fixed to that end of the shaft 36 to have the gear 38 maintained in constant mesh with the gear 34. A crank 39 is fixed on the outer end of the shaft 36 outside of the post 12 as a means of revolving the shaft 36, and hence through the gear 38, revolving the gear 34. The shaft 33, Fig. 1, extends downwardly through the rails 22 and 19 to slide through a block 40 where a key 41 held by that block engages slidingly in a spline 42 provided in the shaft 33 as means to prevent rotation of the shaft 33 while permitting vertical, longitudinal travel thereof. Thus by turning the crank 39, the gear 35 will cause the shaft 33 to travel upwardly or downwardly therethrough depending upon the direction of rotation of the crank. This action will cause lifting and lowering of the front cross bar 30 since the lower end of the post 31 extends loosely through the sleeve 32 to bear indirectly upon the upper end of the shaft 33 appearing within the sleeve. The sleeve serves to prevent lateral shifting of the bar 30 since it maintains the post 31 in vertical alignment with the shaft 33. As the shaft 33 may be raised and lowered, the frame 27 is accordingly rocked about the shaft 24.

A table 44 of any suitable construction is mounted on top of the frame 27 to be guided thereover in a fore and aft direction. In the present showing, the frame 27 is provided with angle irons 45 and 46 mounted along each edge on the top side thereof to have one leg in each instance upturned. To serve as a stop, the angle iron 47 is carried across the rear side of the table on the frame 27. While any type of track such as V-ways may be employed to guide the table 44, in the present showing, the table 44 is provided with angle irons 48 and 49 along the outer longitudinal edges thereof to have the legs of those irons extend under the table 44 by one set and upwardly along its outer edges by the other set of the legs. The transverse dimension is made to be such that the angle irons 48 and 49 will be slidingly guided within the angle irons 45 and 46, Fig. 2.

The table 44 has a motor 50 mounted on its top side in fixed position thereon to have its armature shaft 51 extend therefrom at each side of the motor. The shaft 51 carries pulleys 52 and 53 fixed thereon about which the respective belts 54 and 55 are carried to extend forwardly and be carried around pulleys 56 and 57 mounted respectively on outer ends of a shaft 58 which is carried by the table 44 through the bearings 59 and 60. Inside of the bearings 59 and 60 are pulleys 61 and 62 fixed to the shaft 58 to carry respectively the belts 63 and 64 extending forwardly around pulleys 65 and 66 fixed on the shaft 67. Between the pulleys 65 and 66 is fixed the usual shaped sickle grinding wheel 68.

The shaft 67 is carried by end bearings 69 and 70 that are respectively fixed to angle iron brackets 71 and 72. These brackets 71 and 72 are pivoted respectively through their vertically disposed legs by the bolts 73 and 74 through upturned legs of the brackets 75 and 76 which are fixed to the table 44. In other words, the shaft 67 carrying the grinding wheel 68 may be rocked upwardly from the lowermost resting positions of the brackets 71 and 72 on the top of the table 44.

To control the upper traveling of the shaft 67, some yielding limit means is employed. In the showing herein made, each bracket carrying the shaft 67, as best indicated in Fig. 5, in reference to the bracket 71, has a bolt 77 freely carried downwardly through the horizontal leg of the bracket to screw-threadedly engage with the table 44. Between the head of the bolt 77 and the horizontal leg of the bracket 71 is positioned a spring 78 so that as the shaft 67 may be lifted, that lifting action is resisted by the pressure of the spring 78. It is intended that the brackets 71 and 72 be normally held down in contact with the top face of the table 44. Then in the grinding action, the wheel 68 may initially lift to have downward pressure exerted thereon during the grinding operation.

Referring again to the motor shaft 51, on the extreme outer ends thereof are mounted respectively, in fixed positions, pulleys 80 and 81 to carry respectively belts 82 and 83 extending rearwardly to engage around large diameter pulleys 84 and 85 both fixed to the respective outer ends of a shaft 86 extending across the top side of the sliding table 44 to be carried thereupon through the bearings 87 and 88 fixed to the table. A spur gear 89 is fixed to the shaft 86 between the pulley 84 and bearing 87 to mesh with a much larger diameter spur gear 90 that is fixed to a shaft 91 carried across under the table 44 and mounted thereon by means of the bearings 92 and 93. Then on the opposite end of this shaft 91 is fixed a gear 94 of the same diameter as that of the gear 90, and so positioned as to mesh with the spur gear 95 that is fixed to the shaft 86 between the pulley 85 and the bearing 88, Figures 3 and 6.

A rocker shaft 96 is revolubly mounted on and back of the front frame posts 11 and 12. A lever 97 is fixed on this shaft 96 adjacent the end portion of the shaft 96 toward the post 11 in such position that a pitman rod 98, rockably fixed to the upper end of the lever 97, may extend rearwardly therefrom and along the outer face of the spur gear 90 in parallel alignment therewith to be rockably engaged by its rear end about a crank pin 99 carried by the gear 90. In the same manner, a lever 100 is fixed toward the other end portion of the shaft 96 to have its upper end rockably engaged therewith by a pitman rod 101 which extends rearwardly along the outer face of the gear 90 to be rockably connected thereto about a crank pin 102. The crank pins 99 and 102 are centered on the same radius from the center of the shaft 91 and in the same angular positions. The end connections of the pitman rods with the levers and the gear crank pins are best illustrated in the sectional view in Fig. 8 where, for example, the pitman rod 101 carries a thimble 103 fitting around a stud 104 that is screw-threadedly engaged in the upper end of the lever 100, and the pitman rod is held on the stud by means of a washer 105 bearing against the outer end of the sleeve 103 and there held by the cap screw 106.

Both of the levers 97 and 100 may be simultaneously rocked to different angular positions by rocking the shaft 96. Fixed to an end of the shaft 96, Figs. 6 and 7, is a lever 107 which is carried upwardly along the outer side of the frame rail 16 and slidingly held thereagainst by an outer strap 108 fixed to the rail 16 by its rear end and to the front post 12 by its forward end. The upper end of this lever 107 carries an inturned operating handle 109 and spaced below it is a latch release arm 110. This arm 110 is connected to a vertically disposed rod 111 that is slidingly retained along the inner side of the lever 107 to be normally urged downwardly by means of a spring 112 bearing between a fixed mounting bracket 113 and a pin 114 through the rod 111. The lower end of the rod 111 has an inturned foot 115 which may slide over the sector 116 which is provided with a plurality of notches therein, herein shown as a forward notch 117 and a rear notch 118, in which the foot 115 is shown to be engaged.

When the motor 50 is operating, and the two gears 90 and 94 are rotating about the axis of their shaft 91, the pitman rods 98 and 101 are reciprocating simultaneously. But, by reason of the fact that the levers 97 and 100 are fixed in any one of their shifted positions, the pivot connections with those levers, and the pitman rods 98 and 101 remain fixed, and therefore, as the gears 90 and 94 continue to rotate, the table 44 is reciprocating accordingly. This reciprocating motion carries the grinding wheel 68 forwardly and rearwardly in a definite, timed sequence.

A structure is provided for supporting a sickle to be ground and to move it automatically from one postion to the next position, not only in relation to the transverse diametrical center plane of the grinding wheel 68, but also in reference to the fore and aft travel of the grinding wheel 68. This mechanism is now described as follows.

The customary mowing sickle, generally designated by the numeral 120, carries in the usual fashion a plurality of sections 121 riveted to a bar 122 extending along under the heels of those sections. One end of the bar 122 has attached thereto in the usual manner a driving head, 222, Fig. 1. A sickle carrier is formed, Fig. 4, to have a pair of spaced apart angle irons 123 and 124 with downwardly disposed legs spaced one apart from the other, and upper and oppositely disposed top legs. Between the downturned legs of these angle irons 123 and 124 is fixed a spacer bar 125 extending substantially throughout the entire lengths of those two angle irons. The under surface of this spacer bar 125 is regularly toothed in the nature of a rack bar. This sickle bar carrier thus formed is supported and guided along a fixed track forwardly of the grinding wheel 68.

This fixed track consists essentially of two angle bars 126 and 127, each having oppositely and horizontally disposed upper legs and spaced apart downturned legs fixed in that spaced relation by means of a plurality of brackets 128 consisting of short lengths of angle irons centrally notched to receive the downturned legs of the brackets 126 and 127 within the notch, Figs. 1 and 4, and a horizontally disposed leg across under the lower edges of those downturned legs. The exact construction of these brackets is immaterial to the invention per se since the two angle irons may be held in rigid, fixed, spaced apart relations by other conceivable means.

The track thus formed is mounted forwardly of the frame posts 11 and 12 on the horizontally disposed legs 130 and 131 having their rear ends fixed respectively to the posts 11 and 12, and their outer ends supported by downwardly and rearwardly extending braces 132 and 133. The angle irons 123 and 124 of the sickle carrier are spaced apart at that distance which will require forceful pressing of the sickle bar 122 between those angle irons so that the sickle bar is frictionally retained in a fixed position relative to that carrier. The inner angle bar 124 is provided with a series of V notches 134 to match the V openings between sections 121. Therefore, the sickle 120 is initially positioned on the carrier to have the section openings match with these V openings 134 as indicated in Fig. 3.

A spur gear 135 is revolubly mounted on a shaft 136 below the sickle carrier above described in such manner that this gear 135 is in constant mesh with the teeth of the bar 125. By revolving this gear 135, the sickle can thus be made to travel to the left or right of the grinding wheel 68 as viewed in Fig. 3. Both hand means and mechanical means are provided to set up this travel of the sickle 120. The hand means comprise a spur gear 137 of a smaller diameter than that of the gear 135 mounted to be in constant mesh with that gear 135. The gear 137 is fixed on a mounting shaft 138, and in turn, a hand wheel 139 provided with a grip 140, is fixed on this shaft 138, so that by turning the hand wheel 139, the sickle 120 may be reciprocated as the hand wheel 139 is turned in either direction.

A pair of plates 141 and 142 are rockably carried by the shaft 136, plate 141 on the front side of the gear 135, and plate 142 on the back side. These two plates carry therebetween a pawl 143 normally biased to have the right hand end, Fig. 1, pressed against the teeth of the gear 135 to enter therebetween as the gear 135 may be revolved in a counter-clockwise direction. The pawl 143 is used to set up a counter-clockwise travel of the gear 135 as the two plates 141 and 142 are rocked to the right in unison. The pawl pivot bolt 144 ties together the two plates, as does also a lower pivot bolt 145. A pawl biasing spring 146 interconnects the left-hand end of the pawl 143 with this lower bolt 145. For the hand operation of shifting the sickle, the pawl 143 may be disengaged by rocking the cam 147 by means of the outer handle 148 around against the left portion of the pawl 143 to hold the right portion out of the path of the gear teeth.

The connecting rod 149, adjustable in length, rockably engages the lower bolt 145 by its right hand end, and by its left hand end engages the pin 150 which is held in the upturned arm 151 which is fixed to a horizontally disposed slide bar 251. This slide bar 251 is normally carried to a left hand position by means of the spring 152 interconnecting with the pin 150 and one of the brackets 128 there above and to the left. This slide bar 251 is mounted to slide freely through the horizontally disposed guide bars 153 and 154 carried across at lower ends of the downhanging arms 155, 156, 157 and 158 respectively.

Referring now to Figs. 6 and 7, a cam strap 160 receives across and inside of its rear end portion, a cam 161 that is fixed to the shaft 91. The opening in the strap in the fore and aft direction greatly exceeds the diameter of the cam 161. The strap 160 extends forwardly to be rockably interconnected through the bolt 162 to a lever 163 fixed on a vertically disposed shaft 164 to swing in a horizontal plane. On the lower end of this shaft 164 is fixed a forwardly extending lever 165 to extend under the slide bar 251. This lever 165 is provided with a longitudinal slot 166 through which a bolt 167 may be passed and in turn, through the slide bar 251.

In operation, the motor 50 is energized to cause the grinding wheel 68 to revolve as well as the table 44 to reciprocate as above described. The forward position of this wheel 68 is determined by properly shifting the lever 107 to the forward position from that position indicated in the drawings. However, the sickle 120 is first aligned with that grinding wheel by manipulating the hand wheel 139 and thus shifting the sickle carrier along the supporting track to get the exact alignment. To prevent the outer or heel end of the sickle 120 from kicking up, a retainer plate 170 is carried over the heel ends of those sections 121, and by a downturned portion 171 is secured to the track by the bolts 172. However, the sickle sections may slide freely under this retainer plate 170. Also, it is to be noted that the length of the track and the length of the sickle carrier may be made to accommodate the longest usable sickle by extending the track to the side of the frame work described.

Now as the table 44 reciprocates, it will carry the grinding wheel 68 in and out over the section edges, making two grinding actions thereover for each cycle. As the wheel 68 is carried rearwardly, the cam 161 is so set on the shaft 91 that it will quickly shift the slide bar 251 to rock the gear 135 to shift the sickle over to the left to have its sections aligned for the next grinding action. The diameter and shape of the cam 161 is properly proportioned to give the degree of travel required for the linkage between the strap 159 and the rocker arms 141 and 142. The cam pushes those rocker arms 141 and 142 to the right, whereas the spring 152 returns them to the left.

Thus it is to be seen that a fully automatic grinding machine is provided to take care of all of the grinding required to sharpen the mower sickle sections. While the invention has been described in more or less minute detail in reference to the one particular form as illustrated, it is obvious that any structural changes may be employed without departing from the spirit of the invention, and I therefore do not desire to be limited to that precise form beyond the limitations which may be imposed by the following claims.

I claim:

1. In a machine for grinding a sickle, supporting means; a guide frame rockably mounted on said supporting means to have its forward end swingable in vertical directions; means for adjusting the elevation of said frame front end; a table carried by said frame, reciprocatable in fore and aft directions; a grinding wheel carried by said table to revolve on an axis transversely of said table at the forward end portion of the table; power means supported by said table in driving connection with said wheel; crank means carried by said table and revolved by said power means; a pitman rod engaged by one end to said crank means to reciprocate said pitman rod generally in fore and aft directions; a pitman rod anchor member carried by said frame, to which anchor member the other end of said pitman rod is pivotally connected, whereby said table is reciprocated; a sickle support positioned adjacent said table end, said support being fixed in vertical, and horizontal fore and aft directions in respect to said supporting means; and means for shifting said anchor member to vary the zone of travel of said table.

2. In a machine for grinding a sickle, supporting means; a guide frame rockably mounted on said supporting means to have its forward end swingable in vertical directions; means for adjusting the elevation of said frame front end; a table carried by said frame, reciprocatable in fore and aft directions; a grinding wheel carried by said table to revolve on an axis transversely of said table at the forward end portion of the table; power means supported by said table in driving connection with said wheel; crank means carried by said table and revolved by said power means; a pitman rod engaged by one end to said crank means to reciprocate said pitman rod generally in fore and aft directions; a pitman rod anchor member carried by said frame, to which anchor member the other end of said pitman rod is pivotally connected, whereby said table is reciprocated; a sickle support positioned adjacent said table end, said support being fixed in vertical, and horizontal fore and aft directions in respect to said supporting means; and means for shifting said anchor member to vary the zone of travel of said table; and means yieldingly permitting said grinding wheel to lift relative to said table upon pressure contact of the wheel against said sickle.

3. In a machine for grinding a sickle, supporting means; a guide frame rockably mounted on said means to have its forward end swing in vertical directions; means for adjusting the elevation of said end; a table carried by said frame to be slidable fore and aft thereof; a grinding wheel carried by said table at the forward end thereof; power means supported by the table to drive said wheel; crank means carried by said table and driven by said power means; a pitman rod engaging said crank means by one end; a pivot member carried by said support and to which the other end of said pitman rod engages; and a sickle support transversely positioned adjacent said table front end; said table being reciprocated through said crank and said pitman rod from said pivot member; and means for advancing said sickle step by step upon each table reciprocation.

4. In a machine for grinding a sickle, supporting means; a guide frame rockably mounted on said means to have its forward end swing in vertical directions; means for adjusting the elevation of said end; a table carried by said frame to be slidable fore and aft thereof; a grinding wheel carried by said table at the forward end thereof; power means supported by the table to drive said wheel; crank means carried by said table and driven by said power means; a pitman rod engaging said crank means by one end; a shiftable pivot member carried by said supporting means, to which the other end of said pitman rod engages; a sickle support transversely positioned adjacent said table front end; and means for shifting said pivot member, whereby the path of said wheel may have its forward limit advanced and retracted relative to said sickle support.

5. In a machine for grinding a sickle, supporting means; a guide frame rockably mounted on said means to have its forward end swing in vertical directions; means for adjusting the elevation of said ends; a table carried by said frame to be slidable fore and aft thereof; a grinding wheel carried by said table at the forward end thereof; power means supported by the table to drive said wheel; crank means carried by said table and driven by said power means; a pitman rod engaging said crank means by one end; a shiftable pivot member carried by said supporting means and to which the other end of said pitman rod engages; a sickle support transversely positioned adjacent said table front end; said table being reciprocated through said crank and said pitman rod from said pivot member; means for advancing said sickle along said support step by step upon each table reciprocation; said sickle support comprising a track; said sickle advancing means comprising a sickle carrier carried and guided by said track, a rack gear along said carrier, and gear means interengaging with said rack gear to shift the carrier along the track; and means interposed between said power means and said gear means intermittently turning said gear means a predetermined amount.

6. In a machine for grinding a sickle, supporting means, a guide frame, rockably mounted on said means to have its forward end swing in vertical directions; means for adjusting the elevation of said end; a table carried by said frame to be slidable fore and aft thereof; a grinding wheel carried by said table at the forward end thereof; power means supported by the table to drive said wheel; crank means carried by said table and driven by said power means; a pitman rod engaging said crank means by one end; a shiftable pivot member carried by said supporting means to which the other end of said pitman rod engages; a sickle support transversely positioned adjacent said table front end; said table being reciprocated through said crank and said pitman rod from said pivot member; means for advancing said sickle step by step upon each table reciprocation; said sickle support comprising a track; and said sickle advancing means comprising a sickle carrier carried and guided by said track, a rack gear along said carrier, and gear means interengaging with said rack gear to shift the carrier along the track; a ratchet mechanism for driving said gear means; a cam driven by said power means; and means actuated by said cam to actuate said ratchet mechanism.

7. In a machine for grinding a sickle, supporting means; a guide frame rockably mounted on said means to have its forward end swing in vertical directions; means for adjusting the elevation of said end; a table carried by said frame to be slidable fore and aft thereof; a grinding wheel carried by said table at the forward end thereof; power means supported by the table to drive said wheel; crank means carried by said table and driven by said power means; a pitman rod engaging said crank means by one end; a shiftable pivot member carried by said supporting means and to which the other end of said pitman rod engages; and a sickle support transversely positioned adjacent said table front end; said table being reciprocated through said crank and said pitman rod from said pivot member; and means for advancing said sickle step by step upon each table reciprocation; said sickle support comprising a track; said sickle advancing means comprising a sickle carrier carried and guided by said track, a rack gear along said carrier, gear means interengaging with said rack gear to shift the carrier along the track; a ratchet mechanism for driving said gear means; a member driven by said power means in sequence with travel of said table; and connecting means between said last member and said ratchet means, whereby said sickle carrier is shifted along its tracks once each reciprocation of said wheel, said connecting means providing for said shifting only while said wheel is in its rear end of reciprocation.

ROY HOWELL.

REFERENCES CITED

The following references are of record in the file of this patent:

UNITED STATES PATENTS

| Number | Name | Date |
|---|---|---|
| 567,638 | Clizbe | Sept. 15, 1896 |
| 630,687 | Green | Aug. 8, 1899 |
| 700,226 | Neuens | May 20, 1902 |

FOREIGN PATENTS

| Number | Country | Date |
|---|---|---|
| 383,178 | Germany | Oct. 11, 1923 |
| 418,905 | Germany | Sept. 16, 1925 |
| 32,022 | France | Mar. 22, 1927 |
| | (1st addition to 602,972) | |
| 502,456 | France | Feb. 21, 1920 |